(12) United States Patent
Trajkovska-Broach et al.

(10) Patent No.: US 10,838,258 B2
(45) Date of Patent: Nov. 17, 2020

(54) LIQUID CRYSTAL ALIGNMENT LAYERS AND METHOD OF FABRICATION

(71) Applicant: E-Vision, LLC, Sarasota, FL (US)

(72) Inventors: Anita Trajkovska-Broach, Christiansburg, VA (US); David Boyd, Roanoke, VA (US); Dan Chambers, Roanoke, VA (US); Joseph O. Branham, Farmington, CT (US)

(73) Assignee: E-VISION, LLC, Sarasota, FL (US)

( * ) Notice: Subject to any disclaimer, the term of this patent is extended or adjusted under 35 U.S.C. 154(b) by 127 days.

(21) Appl. No.: 15/940,065

(22) Filed: Mar. 29, 2018

(65) Prior Publication Data
US 2018/0321533 A1    Nov. 8, 2018

Related U.S. Application Data

(62) Division of application No. 14/178,069, filed on Feb. 11, 2014, now Pat. No. 9,939,682.

(60) Provisional application No. 61/769,283, filed on Feb. 26, 2013, provisional application No. 61/765,462, filed on Feb. 15, 2013.

(51) Int. Cl.
*G02F 1/1337* (2006.01)

(52) U.S. Cl.
CPC .... *G02F 1/13378* (2013.01); *G02F 1/133753* (2013.01); *G02F 1/133788* (2013.01); *G02F 2001/133796* (2013.01); *Y10T 29/49147* (2015.01)

(58) Field of Classification Search
CPC .... G02F 1/133; G02F 1/137; G02F 1/133753; G02F 1/13378; G02F 1/133788; G02F 2001/133796; Y10T 29/49147
See application file for complete search history.

(56) References Cited

U.S. PATENT DOCUMENTS

| | | | |
|---|---|---|---|
| 5,389,698 A | 2/1995 | Chigrinov et al. | |
| 6,605,816 B2 | 8/2003 | Sandstrom et al. | |
| 6,852,203 B1 * | 2/2005 | Kawakami | B82Y 20/00 204/192.23 |
| 7,272,290 B2 * | 9/2007 | Sugita | B82Y 20/00 385/129 |
| 8,023,179 B2 * | 9/2011 | Nicholson | G02F 1/353 359/326 |
| 8,742,406 B1 * | 6/2014 | Leung | H01L 27/14627 257/40 |

(Continued)

FOREIGN PATENT DOCUMENTS

| | | |
|---|---|---|
| EP | 0392840 B1 | 3/1994 |
| JP | S6060624 A | 4/1985 |

(Continued)

OTHER PUBLICATIONS

European Search Report dated Sep. 21, 2016, for European Application No. 14750985.5, ISA/EPO, Munich, Germany.

*Primary Examiner* — Carl J Arbes
(74) *Attorney, Agent, or Firm* — Smith Baluch LLP

(57) ABSTRACT

Methods are provided for making layers with nano- and micro-patterned topographies by laser action or inkjet printing on a first surface. These topographies have a periodicity of 5 nm to 500 µm in a first direction in the plane of the first surface. These layers can be used as anisotropically patterned alignment layers in electro-optical devices and generate an orientational order of at least 0.30.

19 Claims, 13 Drawing Sheets

(56) References Cited

U.S. PATENT DOCUMENTS

| | | |
|---|---|---|
| 8,840,146 B2 | 9/2014 | Stalder |
| 9,096,026 B2 | 8/2015 | Hall et al. |
| 9,391,235 B2 * | 7/2016 | Wuu ................ C30B 25/18 |
| 9,939,682 B2 | 4/2018 | Trajkovska-Broach et al. |
| 2003/0011870 A1 | 1/2003 | Otake et al. |
| 2003/0072412 A1 | 4/2003 | Martynov et al. |
| 2005/0287445 A1 | 12/2005 | Liu |
| 2007/0020404 A1 | 1/2007 | Seiberle et al. |
| 2009/0179418 A1 | 7/2009 | Stalder |
| 2014/0237817 A1 | 8/2014 | Trajkovska-Broach et al. |

FOREIGN PATENT DOCUMENTS

| | | | |
|---|---|---|---|
| JP | S60217339 A | | 10/1985 |
| JP | S60244929 A | | 12/1985 |
| JP | 1011232 A | * | 1/1989 |
| JP | H0627323 A | | 2/1994 |
| JP | H0743716 A | | 2/1995 |
| JP | H09152612 A | | 6/1997 |
| JP | 2001356351 A | | 12/2001 |
| JP | 2004309780 A | | 11/2004 |
| KR | 20010001775 A | | 1/2001 |

* cited by examiner

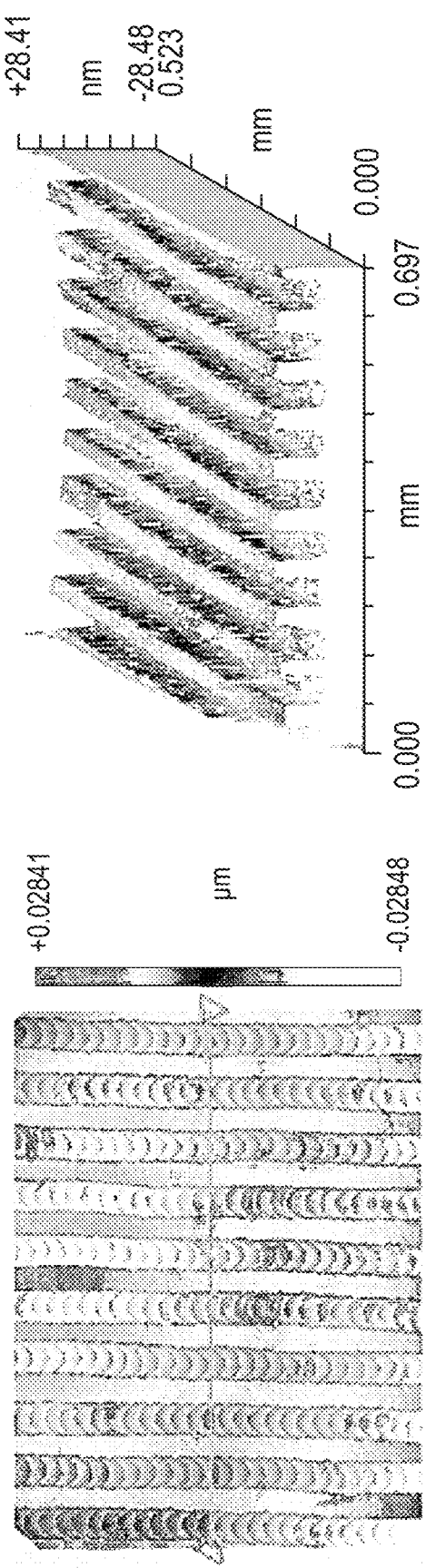
FIG. 10A
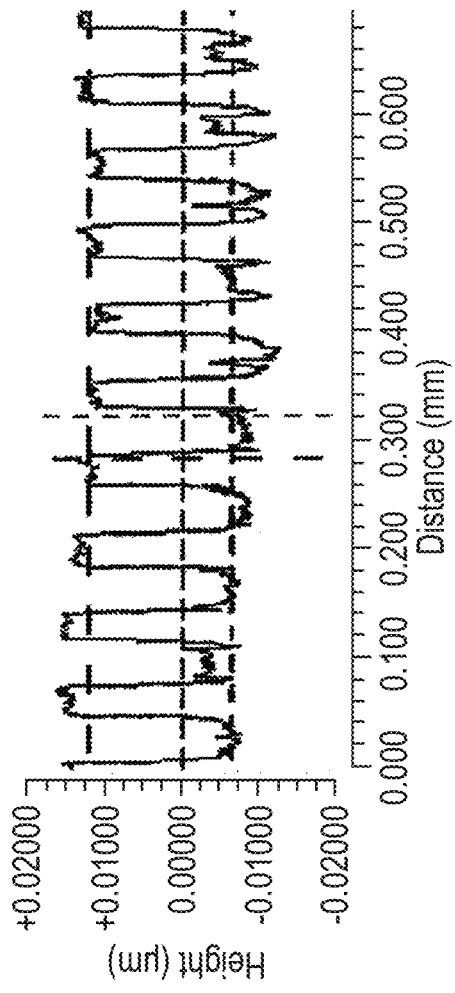
FIG. 10B
FIG. 10C

LIQUID CRYSTAL ALIGNMENT LAYERS AND METHOD OF FABRICATION

CROSS-REFERENCE TO RELATED APPLICATIONS

The present application is a divisional of U.S. application Ser. No. 14/178,069, filed Feb. 11, 2014, which in turn claims the priority benefit, under 35 U.S.C. § 119(e), of U.S. Application No. 61/769,283, filed Feb. 26, 2013, and of U.S. Application No. 61/765,462, filed Feb. 15, 2013. Each of these applications is incorporated by reference herein in its entirety.

BACKGROUND

Electro-optical devices may contain one or more liquid crystal (LC) layers. These layers are comprised of material which undergoes changes in its optical, electrical, and magnetic characteristics under an externally applied field. These layers are included in to electro-optical devices because visual changes in these devices occur due to different orientations of LC molecules during different states of device operation (e.g. completely ON-state, completely OFF-state, and many other different states in-between). Depending on the operation mode of the electro-optical device, the so-called field-free LC orientation (OFF-state) and a range of predetermined distributions can be distinguished from the LC orientations under the applied voltage (ON-state). For successful operation and performance of electro-optical devices, the LC material should be appropriately aligned during the field-free state.

SUMMARY

The present invention generally relates to alignment surface topographies for electro-active devices and more specific to methods of forming these topographies. In one embodiment, a method is described where a first surface is provided. A solution is deposited over the first surface via inkjet printing to form a first anisotropic pattern. The first anisotropic pattern that is formed by the deposition has a first periodicity of 5 nm to 500 pm in a first direction in the plane of the first surface. The solution is solidified to form a first anisotropically patterned alignment layer having features with a size of 5 nm to 500p.m.

In one embodiment the first anisotropic pattern has a second periodicity in a second direction in the plane of the surface. In one embodiment, the first and second directions are different, the first and second periodicities are different, and the second periodicity is 5 nm to 500 μrrL In one embodiment, the step of depositing a solution over the first surface includes forming a second anisotropic pattern on the first surface.

In one embodiment, the step of depositing a solution includes depositing drops of the solution and the step of solidifying the solution includes a partial coalescence of the drops while retaining at least some structure of the first periodicity.

In one embodiment, the step of depositing a solution comprises using an inkjet with a nozzle size from 50 nm to 500 μm.

In one embodiment, the first surface is a first surface of a substrate. In one embodiment, the first surface is a first surface of an electrode. In one embodiment, the first surface is a first surface of a separate layer disposed on an electrode or a substrate.

In one embodiment, the method further comprises providing a first substrate and providing a first electrode disposed over the first substrate. The first surface is disposed over the first electrode. The method further comprises providing a liquid crystal layer disposed over the first surface, providing a second surface disposed over the liquid crystal layer, providing a second electrode disposed over the second surface, and providing a second substrate disposed over the second electrode.

In one embodiment, the step of providing a second surface includes depositing a solution over the second surface via inkjet printing to form a second anisotropic pattern and solidifying the solution to form a second anisotropic ally patterned alignment layer having features with a size of 5 nm to 500 μm. The second anisotropic pattern formed by the deposition has a third periodicity of 5 nm to 500 μm in a third direction in the plane of the second surface.

In one embodiment, the second anisotropic pattern has a fourth periodicity in a fourth direction in the plane of the second surface. The third and fourth directions are different, the third and fourth periodicities are different, and the fourth periodicity is 5 nm to 500 μm.

In one embodiment, depositing a solution on the first surface comprises either translational movement of the inkjet over the first surface in the first direction or translational movement of the substrate in the first direction.

In one embodiment, the step of solidifying the solution includes shrinking the solution through ultra-violet irradiation. In one embodiment, the step of solidifying the solution includes shrinking the solution through infra-red heating.

In one embodiment, the solution comprises one of or a combination of conjugated polymers, acrylates, urethanes, organosilanes, and epoxies. In one embodiment, the solution comprises surfactants or binders. In one embodiment, the solution comprises a solvent comprising one or a combination of alcohols, ketones, aldehydes, alkanes, alkenes, or chlorinated solvents. In one embodiment, the solution comprises nanoparticles of metals or metal oxides. In one embodiment, the solution comprises carbon nanotubes.

In one embodiment, the anisotropically patterned alignment layer is capable of generating noticeable alignment in a nematic, cholesteric, smectic, discotic, or blue-phase liquid crystal layer.

In one embodiment, the anisotropically patterned alignment layer is capable of generating alignment with an orientational order parameter of at least S=0.50 in a nematic liquid crystal layer.

In one embodiment, the anisotropically patterned alignment layer is capable of light management property, light scattering effect or light diffraction.

In one embodiment, the first and second directions are perpendicular to each other.

In one embodiment, the first surface is flexible. In one embodiment, the first surface is rigid.

In one embodiment, a method is described where a first surface is provided. Laser energy is applied to the first surface to form a first anisotropically patterned alignment layer comprising a first anisotropic pattern with features with a size of 0.1 nm to 500 μm. The first anisotropic pattern has a first periodicity of 5 nm to 500 μm in a first direction in the plane of the first surface. In one embodiment, the first anisotropically patterned alignment layer has features with a size of 5 nm to 500 μm.

In one embodiment, the laser energy is applied in pulses.

In one embodiment, the first anisotropic pattern has a second periodicity of 5 nm to 500 μm in a second direction in the plane of the surface. The first and second directions are different and the first and second periodicities are different. In one embodiment, the first and second directions are perpendicular to each other.

In one embodiment, the first surface is a first surface of a substrate. In one embodiment, the first surface is a first surface of an electrode.

In one embodiment, the first surface is a first surface of a separate layer disposed on an electrode or a substrate.

In one embodiment, the method further comprises providing a first substrate and providing a first electrode disposed over the first substrate. The first surface is disposed over the first electrode. The method further comprises providing a liquid crystal layer disposed over the first surface, providing a second surface disposed over the liquid crystal layer, providing a second electrode disposed over the second surface, and providing a second substrate disposed over the second electrode.

In one embodiment, the step of disposing a second surface comprises applying laser energy to the second surface to form a second anisotropically patterned alignment layer comprising a second anisotropic pattern with features with a size of 0.1 nm to 500 µm. The second anisotropic pattern has a third periodicity of 5 nm to 500 µm in a third direction in the plane of the second surface.

In one embodiment, applying laser energy to the first surface comprises translational movement of the laser over the first surface in the first direction or, translational movement of the first surface in the first direction.

In one embodiment, the first surface comprises polymers. In one embodiment, the first surface comprises inorganic materials. In one embodiment, the first surface comprises nanoparticles of metals or metal oxides. In one embodiment, the first surface comprises carbon nanotubes.

In one embodiment, the anisotropically patterned alignment layer is capable of generating noticeable alignment in a nematic, cholesteric, smectic, discotic, or blue phase liquid crystal layer. In one embodiment, the anisotropically patterned alignment layer is capable of generating alignment with an orientational order parameter of at least S=0.40 in a nematic liquid crystal layer.

In one embodiment, the anisotropically patterned alignment layer is capable of light management property, light scattering effect, or light diffraction.

In one embodiment, the first surface is flexible. In one embodiment, the first surface is rigid.

In one embodiment, the method includes applying laser energy to the first anisotropically patterned alignment layer to form a second anisotropic pattern.

BRIEF DESCRIPTION OF THE DRAWINGS/FIGURES

FIGS. 1A-B show exemplary anisotropically patterned alignment layers with anisotropic patterns having one periodicity.

FIG. 10A-10C illustrates an example of an anisotropically patterned alignment layer made with 1064 nm laser beam at a scanning speed of 400 mm/s and 20 kHz in ITO first surface. FIG. 10A shows a top view, FIG. 10B shows an oblique view, and FIG. 10C shows a cross-section view.

Figure 12A:
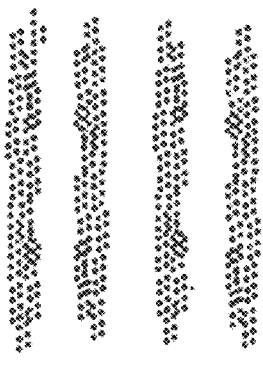
Figure 12B:
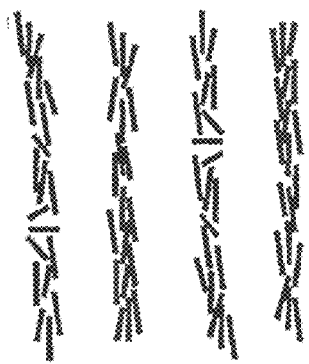

FIGS. 12A-B show surface arrangements of nanoparticles and carbon nanotubes in the anisotropic patterns.

DETAILED DESCRIPTION OF THE INVENTION

The field-free LC orientation is provided by the boundary conditions of a geometry confining the LC layer. These boundary conditions are dictated by the alignment layers. The basis for the molecular orientation of the LC material is the physical and/or chemical anisotropy on the surface of an alignment film. These surface characteristics result in an anisotropic arrangement of the adjacent LC molecules.

Conventionally, the alignment layer is created by the unidirectional mechanical rubbing of polymer films with a rubbing cloth. This method has been widely used due to its simplicity, durability and low-cost. However, the generation of dust and electrostatic surface charge during the rubbing, as well as mechanical surface defects can be detrimental for electro-optical device performance and lifetime. Moreover, the debris generation is not in line with the clean-room requirements, while the high processing temperature of polyimide alignment films limits their application on many flexible substrates. Additionally, with the rubbing method it is difficult to achieve different LC orientations within a micron-size (or smaller) domains.

To overcome the limitations of mechanical rubbing, alternative methods for generation of surface anisotropy may be used. One promising alternative is photoalignment, which utilizes polarized light to generate chemical anisotropy on photo-reactive surfaces via directional photo-reaction (e.g., isomerisation, anisotropic cross-linking, or directional photo-degradation). Anisotropic intermolecular interactions between different surface molecular species have been shown to be sufficient to align the LC molecules. Photoalignment offers the possibility of micro-patterning via photo-mask for multi-domain LC orientations, as well as feasibility on flexible substrates. However, the majority of the photoalignment materials suffer from long-term stability (light, thermal and/or chemical instability).

Therefore, there is a need of inexpensive LC alignment films, which provides stable LC orientation, with high fabrication reproducibility and reliable continuous control. The main requirements for the alignment layer are its thermal- and photo-stability over time and during device operation, as well as its "electrical" stability to survive many dynamic (switching) cycles under externally applied fields.

Embodiments disclosed herein relates to layers with nano- and micro-patterned topographies made by laser action or inkjet printing for their potential application as alignment layers of liquid-crystalline molecules in variety of passive and active LC-based devices, viz. light-management films, compensation films, polarizers, tunable wave-plates, variable filters, different liquid crystal display (LCD) modes (e.g. twisted nematic (TN), super-twisted nematic (STN), electrically controlled birefringence (ECB), optically compensated bend (OCB), vertical alignment (VA), dynamic ophthalmic products, tunable beam splitters, polarized organic emitting diodes (OLEDs), bipolar organic field-effect transistors (OFETs), etc.

Embodiments herein cover a variety of anisotropic surface nano-/micro-topographies, which differ in their chemical nature, pattern shape, size, periodicity, and anchoring strength. The nanometer- and micrometer-size surface features of the alignment layers can provide a variety of liquid crystal (LC) orientations, including planar, tilted or homeotropic. These alignment layers have a wide spectrum of designed nano-/micro-topographies and can also provide orientation of different rod-like and discotic-shaped LC molecules, including but not limited to nematic, smectic, cholesteric, discotic, and blue-phase LCs.

The surface topography of the alignment film and the confinement effects of nano- and micro-structures on the overlaying LC molecules, coupled with the complex interplay of intermolecular interactions on LC-solid surface interface (mainly dipolar, Van der Waals, and steric interactions), dictate the LC alignment and electro-optical (magneto-optical) response of final LC devices. Moreover, not only the physics, but the chemistry of alignment surfaces can be tailored, which directly affect the surface anchoring of LC molecules. In this way, alignment layers with tailored anchoring energy, i.e. layers that could provide mono-stable, bi-stable or multi-stable anchoring conditions are possible.

The alignment layers disclosed herein, which provide the LC orientation in the field-free state of device operation, are layers with nanometer- and micrometer-size topographic features. In an electro-optical device, these alignment layers are usually located on the inner side of both substrates, adjacent to the LC layer. "Alignment layer" as used herein includes a separate layer disposed over the substrate, a separate layer disposed over an electrode, and the substrate or electrode acting as the "alignment layer". Additionally, the alignment layer can be located with intervening layers between it and the LC layer. A broad spectrum of surface topographies can be achieved to provide specific LC orientations, ranging from no-tilt in-plane (planar) LC orientation via variety of predetermined tilt-angle LC orientations to fully vertical (homeotropic) LC orientation.

Figure 1A:
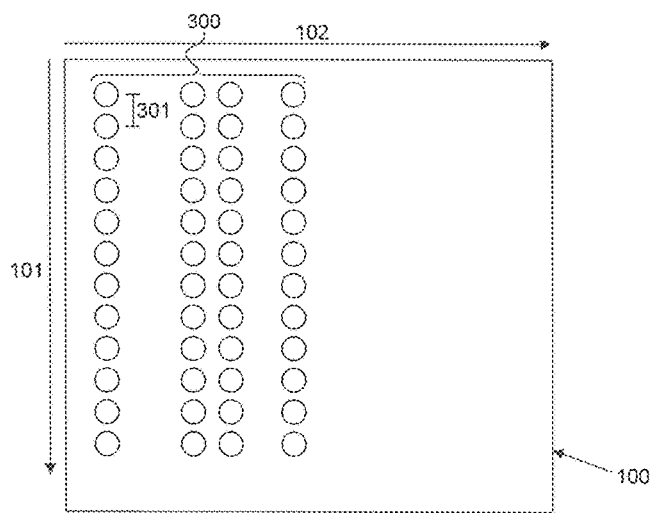

FIG. 1A shows an exemplary alignment layer comprised of a first surface 100. The first surface has an anisotropic pattern 300 with nano or micro-structured topographies. The nano or micro-structured topographies can also be called surface features.

The anisotropic pattern 300 has a first periodicity 301. Preferred ranges for the first periodicity include 0.1 nm to 500 µm, 0.1 nm to 1 nm, 0.5 nm to 1 nm, 0.5 nm to 500 µm, 50 nm to 500 µm, and more preferably from 5 nm to 500 µm. Generally for periodicities and dimensions discussed throughout, smaller values may have a stronger alignment effect. Larger values may be simpler to fabricate.

Figure 1B:
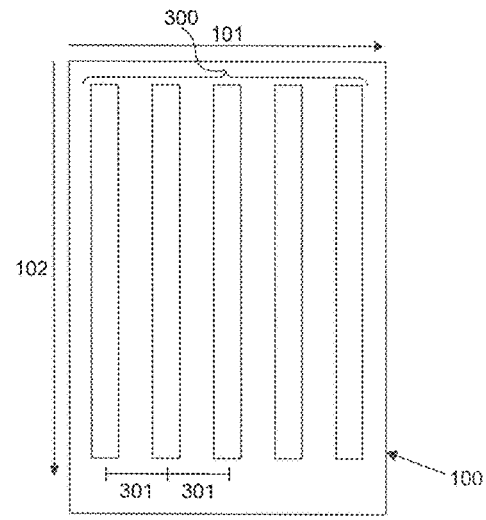

The first periodicity runs in the first direction 101 of the surface 100. As used herein "periodicity" is defined as the center-to-center distance between two neighboring surface features. This can also be called the pitch. FIG. 1B shows another embodiment of the anisotropic pattern 300. The anisotropic pattern 300 in FIGS. 1A and 1B do not have a second periodicity in a second direction 102 of the surface.

Figure 2:
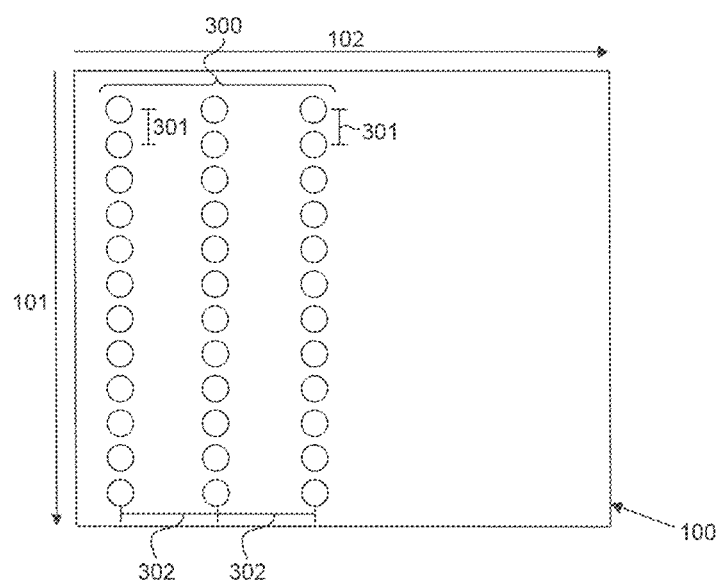
FIG. 2 shows an exemplary anisotropically patterned alignment layer with an anisotropic pattern having two periodicities.

FIG. 2 shows another embodiment of an alignment layer on a first surface 100. This alignment layer is similar to the alignment layers of FIGS. 1A and 1B except that its anisotropic pattern 300 has a second periodicity 302 running in the second direction 102 of the first surface 100. Preferred ranges for the second periodicity include 0.1 nm to 500 µm, 0.1 nm to 1 nm, 0.5 nm to 1 nm, 0.5 nm to 500 µm, 50 nm to 500 µm, and more preferably from 5 nm to 500 µm. It is preferably different from the first periodicity 301. As shown in FIG. 2, the two directions 101 and 102 that the two periodicities run in are also different from each other. These two directions can be perpendicular to each other, like in FIG. 2, or can be at any angle to each other, like in FIG. 3

Figure 3:
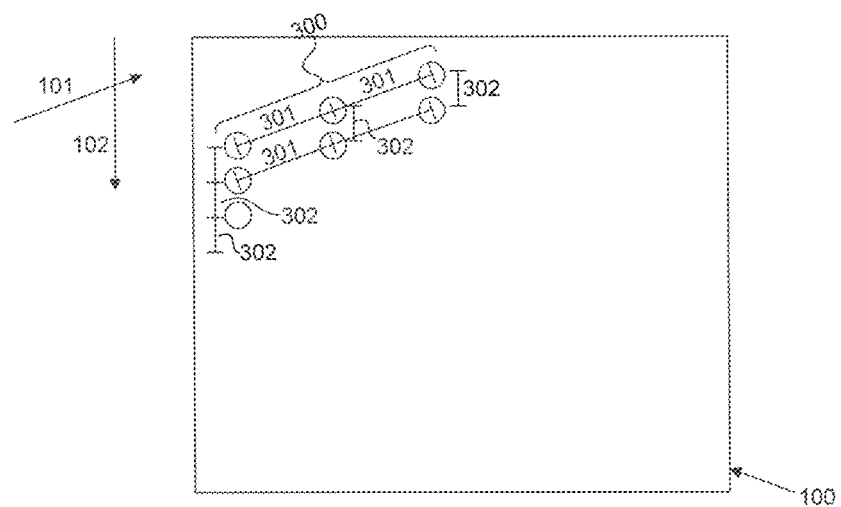
FIG. 3 shows an exemplary anisotropically patterned alignment layer with an anisotropic pattern having two periodicities in non-perpendicular directions.
Figure 4:
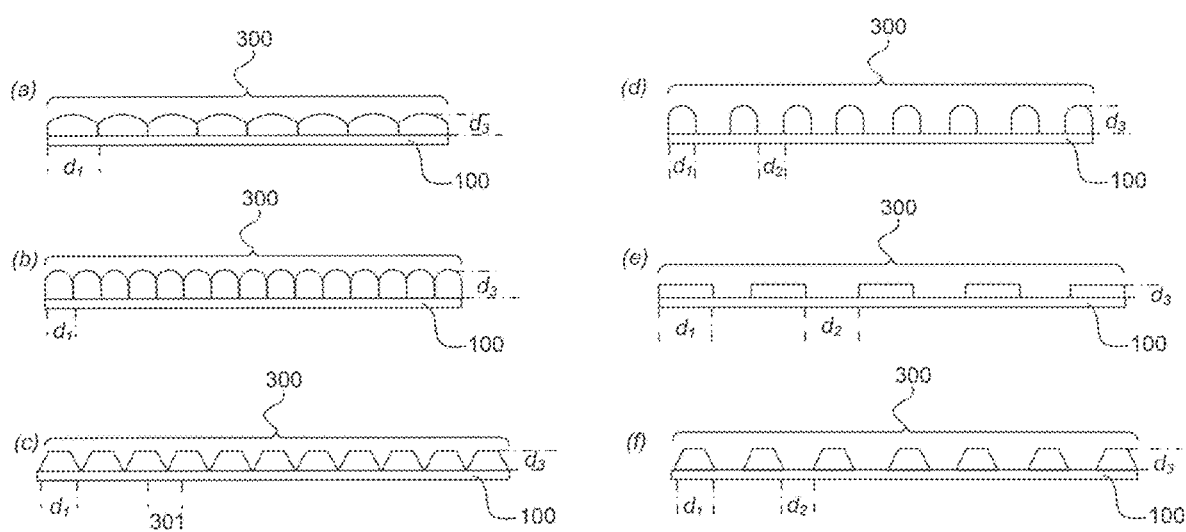
FIG. 4 shows exemplary cross-sectional views of anisotropically patterned alignment layers comprising the anisotropic patterns.

The surface features or topographies of the anisotropic pattern have a size from 0.1 nm to 500 µm. As used herein, "size" can include the height, width, and length of the features. A surface feature preferably has all three dimensions (height, width, length) in that range. Alternatively, a surface feature may have only one or two dimensions in the size range. For example, a topography of grooves may have a length corresponding to a substrate dimension that exceeds the range, but groove widths and heights within the range. The surface features described herein can be raised or lowered from the first surface. "Height" as used herein means the distance from the first surface to the peak of surface feature or the distance from the first surface to the valley of the surface feature. FIG. 4 is a cross-sectional view of exemplary alignment films, showing the height and width (dimensions $d_1$ and $d_3$) of the topographies of exemplary patterns. FIG. 4 also shows $d_2$, the space between the end of one feature to the beginning of another feature. $d_2$ can be from 0 to 500 µm. A zero value for $d_2$ means that the surface features may touch or overlap each other but, as shown in FIG. 3a-c, there may be some periodic variation even in a direction where surface features touch. FIG. 4 also shows the periodicity 301 in one direction of the first surface 100. While FIG. 4 shows topographies with certain shapes, the embodiments disclosed herein are not limited to those shapes and can include others known in the art. One pattern 300 can have topographies of multiple shapes. Additionally, while FIGS. 1-4 show the first surface having only one pattern 300, the first surface can contain more than one pattern in different regions of the first surface.

Figure 5A:
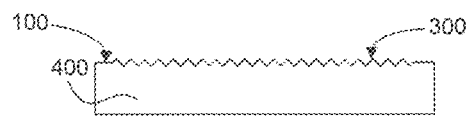
FIGS. 5A-5C show exemplary locations of the alignment layer in an electro-optical device.
Figure 5B:
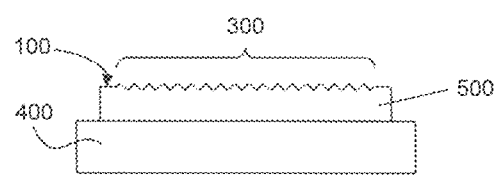
Figure 5C:
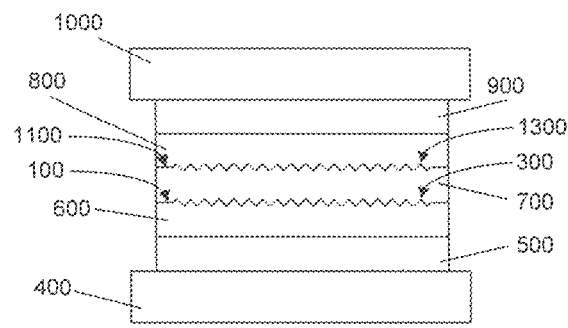

The alignment layers in FIGS. 1-4 may be incorporated into electro-optical devices. The alignment layer affects the alignment of the LC material during the field-free state. As shown in FIG. 5A, the alignment layer disclosed herein may be a surface of a substrate 400 in an electro-optical device. In other embodiments, it may be a surface of an electrode 500 as shown in FIG. 5B. In other embodiments still, it may be a separate alignment layer 600 that is disposed over an electrode or substrate layer in the device as shown in FIG. 5C. An electro-optical device may have one or more alignment layers. Preferably, there are two alignment layers, placed adjacent to the liquid crystal layer. This is shown in FIG. 5C with alignment layers 500 and 800. However, the alignment layer can be placed such that there are intervening layers between the LC layer and the alignment layer.

The alignment layers disclosed herein are capable of generating noticeable alignment in a LC layer. These LC layers include but are not limited to nematic, cholesteric, smectic, discotic, and blue-phase layers. As used herein, "noticeable alignment" means an orientational order parameter Sin the LC molecules greater than the absolute value of 0.3, and preferably greater than the absolute value of 0.4. Preferably, these alignment layers are capable of generating alignment with an orientational order parameter of at least 0.50 in a nematic liquid crystal later.

The alignment layers disclosed herein can be rigid or flexible, depending on the characteristic of the first surface.

In some embodiments, the alignment layers disclosed herein and their nano- and micro-structured topographies can be made by inkjet printing. In other embodiments, they can be made by laser action. These methods are described below.

Inkjet printing is a solution dispensing technique that is characterized by its non-contact and material-efficient processing in a highly-reproducible manner.

The final surface features of the alignment layers made by inkjet printing are highly dependent on the processing parameters. These parameters include but are not limited to the inkjet nozzle diameter, the volume of the droplets, the temperatures of the solution and substrate, the moving speed of substrate (or inkjet), and material properties of the substrate and the solution. The material properties include but are not limited to: the nature of the solution used, specifically the solvent used and its viscosity, vapor pressure and surface tension; ink or solution concentration; and the nature of the substrate (for example, its wetting characteristics). Overall, the final topography is a complex interplay of many factors. One of skill in the art, with the benefit of this disclosure, can readily use these parameters to generate disclosed surface features.

Figure 6:
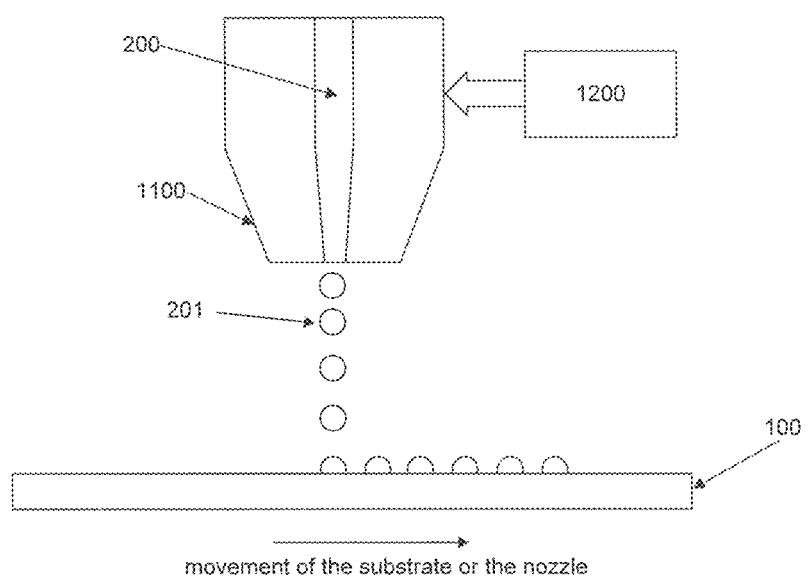
FIG. 6 shows an exemplary method of making the anisotropically patterned alignment layer using inkjet printing.

In one embodiment, the alignment layer is made by depositing a solution 200 over the first surface 100. The first surface can be the first surface of a substrate, electrode, or a separate layer disposed on an electrode or a substrate. In some embodiments, the solution is ink. As seen in FIG. 6, depositing can be done in some embodiments by ejecting ink droplets 201 from an inkjet printing nozzle 3000 in a drop-by-drop manner. The nozzle diameter has an effect on the droplet size. When depositing is ejecting ink droplets, the nozzle diameter of the inkjet, together with the volume of the ejected droplets and their subsequent coalescence on the substrate surface, will partially define the final surface features that form. In one embodiment, the nozzle diameter is 50 nm to 500 µm, preferably from 50 nm to 1 µm. However, one of ordinary skill in the art, with the benefit of this disclosure, can readily generate the disclosed surface features with any suitable nozzle diameter.

The solution is deposited on the first surface 100 such that an anisotropic pattern 1600 is formed on the first surface 100. The dot spacing (defined as the center-to-center distance between two neighboring droplets of solution) and the rate of substrate-/inkjet printing nozzle-movement, will affect the anisotropic pattern that is formed and the periodicities present in the anisotropic pattern. In some embodiments, the nozzle is moved while the first surface is kept still. In other embodiments, the first surface 100 is moved.

Figure 7A:
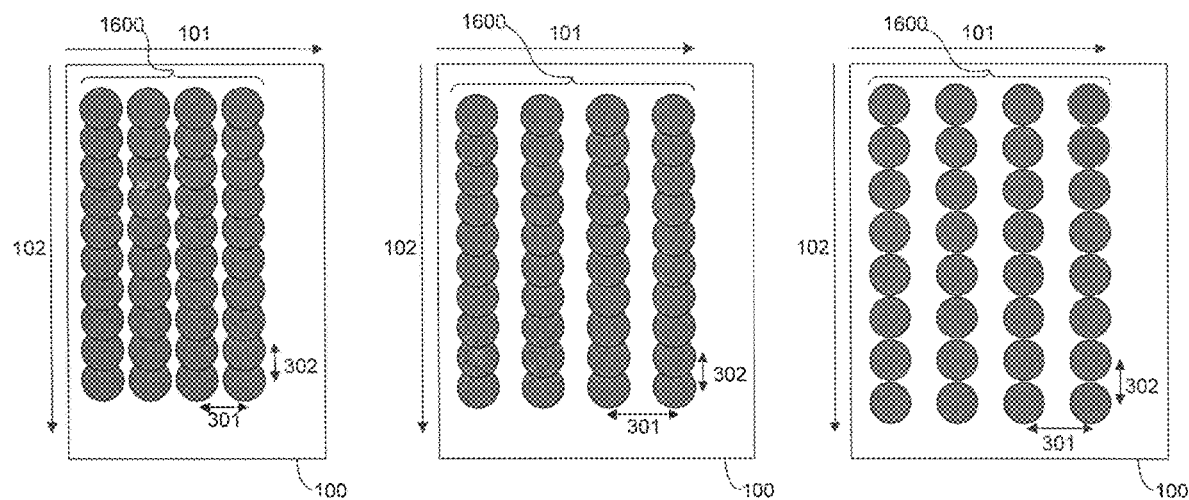
FIG. 7A shows exemplary anisotropic patterns made by inkjet printing according to one embodiment.
Figure 7B:
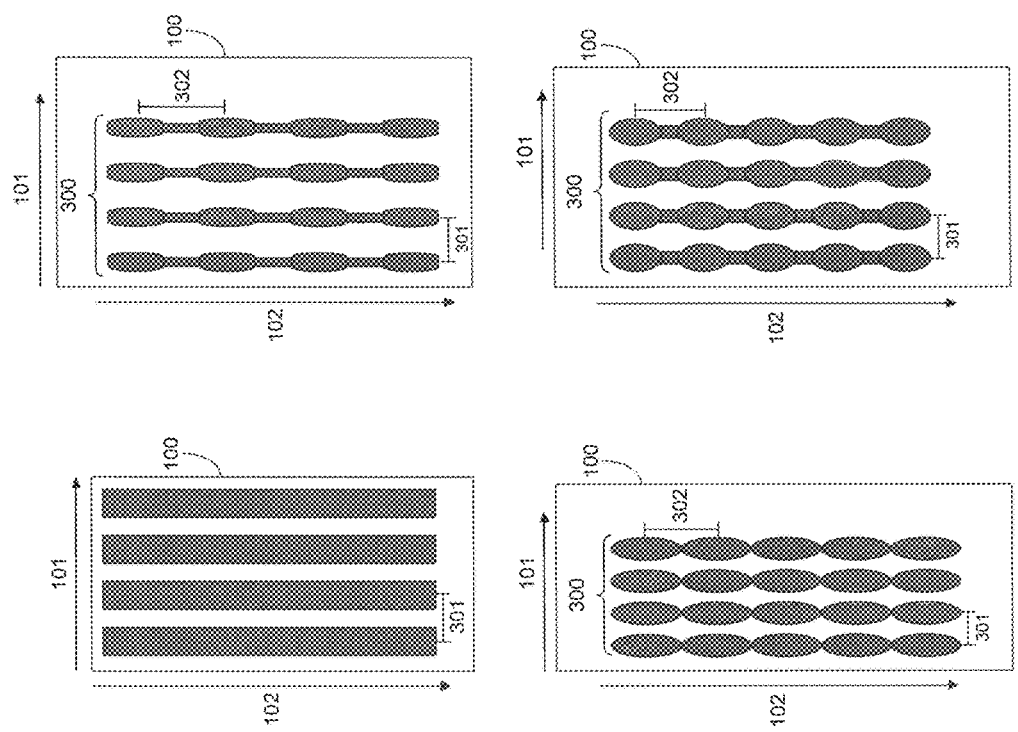
FIG. 7B shows exemplary anisotropically patterned alignment layers formed by solidification.

FIGS. 7a-7c show exemplary resulting anisotropic patterns. As seen in FIGS. 7a-c, each anisotropic pattern 1600 created by the deposited solution has a periodicity 301 in the first direction 101 of the first surface and a second periodicity 302 in a second direction 102 of the first surface 100. Preferred ranges for the first and second periodicities include 0.1 nm to 500 µm, 0.1 nm to 1 nm, 0.5 nm to 1 nm, 0.5 nm to 500 µm, 50 nm to 500 µm, and more preferably from 5 nm to 500 µm. The initial anisotropic pattern 1600 has an effect on the resulting anisotropically patterned alignment layer. Thus, an anisotropic pattern 1600 having two periodicities may have different periodicities, with one being bigger than the other. In this way, after solidification of the anisotropic pattern 1600, directional channels/grooves are formed in the first surface 100 such that it can be used as an alignment layer. The directions 101 and 102 can be parallel to the first surface's x axis and y axis or in other directions as long as they are different from each other. In some embodiments, the directions 101 and 102 may be perpendicular to each other. While not shown, embodiments herein also include anisotropic patterns 1600 that have only one periodicity 301 in one direction 10L.

After depositing the anisotropic pattern 1600, the solution is solidified in order to from an anisotropically patterned alignment layer with anisotropic pattern 300. Anisotropic pattern 300 here is similar with similar attributes of those described in FIGS. 1-4. The surface features may have a size from 0.1 nm to 500 µm. Smaller ranges may be better for LC alignment, thus, the size is preferably from 0.1 nm to 1 nm, 0.5 nm to 1 nm, 0.5 nm to 500 µm, 5 nm to 500 µm, and more preferably from 50 nm to 500 µm. As used herein "solidifying" or "solidified" includes any method that turns the solution into a solid, including cross-linking, solvent evaporation, a combination of the two, or other methods known in the art.

In one embodiment, the step of solidifying may alter anisotropic pattern 1600 such that the resulting anisotropic pattern 300 on the anisotropically patterned alignment layer is different from the initial anisotropic pattern 1600. For example, in some embodiments, the solution 200 may have viscosity or surface tension properties that cause the solution to coalescence during solidification. Additionally, the first surface 100 may have surface wetting characteristics that contribute to the coalescence of the solution 200. FIG. 8a-8c show exemplary topographies after the solution is solidified on the first surface. These topographies show a coalescence of the deposited solution. The final anisotropic patterns 300 shown in FIG. 8a-8c are different from the deposited patterns 1600 shown in FIGS. 7a-7c. The solution viscosity, density and concentration, the ink and substrate temperature, as well as the nature of the solvent(s) used, especially solvent vapor pressure and evaporation rate will determine the final pattern on the first surface. Additionally, some solutions might require additional baking by UV irradiation or by IR heating during solidification, at which stage the solution shrinkage will play a major role in the final shape of the anisotropic pattern 300.

In some embodiments, the anisotropic pattern 300 is solidified in such a manner that the deposited anisotropic pattern 1600 is the same as final anisotropic pattern 300 on the anisotropically patterned alignment layer. For example, in some embodiments, the solution and the substrate properties are not conducive to coalescence and the drops do not coalescence. As used herein, "change" or "different" includes a change in the size and shape of the pattern's features. Despite the amount of coalescence or change between the two patterns 1600 and 300, the resulting anisotropic pattern 300 still retains at least some structure of the periodicities contained in the anisotropic pattern 1600.

In some embodiments, the pattern's chemical nature may also affect the orientation of overlaying LC molecules. Thus, the type of solution used in the method not only affects the final pattern but will also affect the orientation of the LC molecules due to its chemical interaction of the pattern with the molecules of the LC layer. For example, a pattern made of solution comprising acrylate may generate very different LC orientations than the same pattern made from a solution comprising Teflon. In the case of acrylate patterns, the LC alignment is most likely to be planar or low tilt planar LC alignment, while Teflon patterns are expected to cause a homeotropic LC alignment. Solutions used in the method disclosed herein include but are not limited to those comprising solvents, surfactants, and binders such as conjugated polymers, acrylates, urethanes, organosilanes, epoxies, alcohols, ketones, aldehydes, alkanes, alkenes, or chlorinated solvents.

In some embodiments, solutions used to deposit patterns may include nanoparticles of metals, metal oxides, and/or carbon nanotubes, individually or in any combination. Such nanoparticles/nanotubes might further help in the orientation of the overlaying LC molecules, but also might contribute to additional property of the alignment layer such as light diffraction, light management (including but not limited to focusing or defocusing light rays), or light scattering effects. By adjusting the inkjet printing conditions and their coalescent behavior, the nanoparticles/nanotubes might be "ordered" in certain patterns on the substrate surface. This ordering is shown in FIGS. 12A-B. The alignment layers made by this method thus results in the anisotropically patterned alignment layers as described in FIGS. 1-4.

In some embodiments, methods may further include steps for incorporating the first surface 100 into an electro-optical device as shown in FIG. 5C. These steps comprise providing a first substrate 400 and providing a first electrode 500 disposed over the first substrate. The method may further comprise disposing the first surface 100 over the first electrode 500, providing a liquid crystal layer 700 disposed over the first surface, providing a second surface 1100 disposed over the liquid crystal layer, providing a second electrode 900 disposed over the second surface, and providing a second substrate 1000 disposed over the second electrode 900. As used herein, "disposed over" allows for intervening layers between the first surface and the substrate. The second surface 1100 has a second anisotropic pattern 1300 formed on the second surface. The second anisotropic pattern 1300 is similar to the anisotropic pattern 300 and is formed in the same manner as the first anisotropic pattern 300.

In one embodiment, the alignment layers described in FIGS. 1-4 may be made by laser action. The resulting surface features described in FIGS. 1-4 may be highly dependent on the first surface material properties, as well as the laser processing parameters (for example including but not limited to laser pulse, laser power, and laser scanning rate). Overall, the final topography of the alignment layer is a complex interplay of many factors including but not limited to material properties and laser parameters. One of skill in the art, with the benefit of this disclosure, can readily use these parameters to generate disclosed surface features.

In some embodiments, to make the anisotropically patterned alignment layer in FIGS. 1-4, laser energy is applied to a first surface 100 to form a first anisotropic pattern 300 with surface features. These features have sizes from 0.1 nm to 500 µm. Smaller ranges may be better for LC alignment, thus, the size is preferably from 0.1 nm to 1 nm, 0.5 run to 1 nm, 0.5 nm to 500 µm, 50 nm to 500 µm, and more preferably from 5 nm to 500 µm. The features may have at least one of length and width in the range from 0.1 nm to 50 nm, preferably 0.5 nm to 50 nm.

The first surface can be a surface on a substrate, a surface on an electrode, or a surface of a separate layer.

Figure 9:
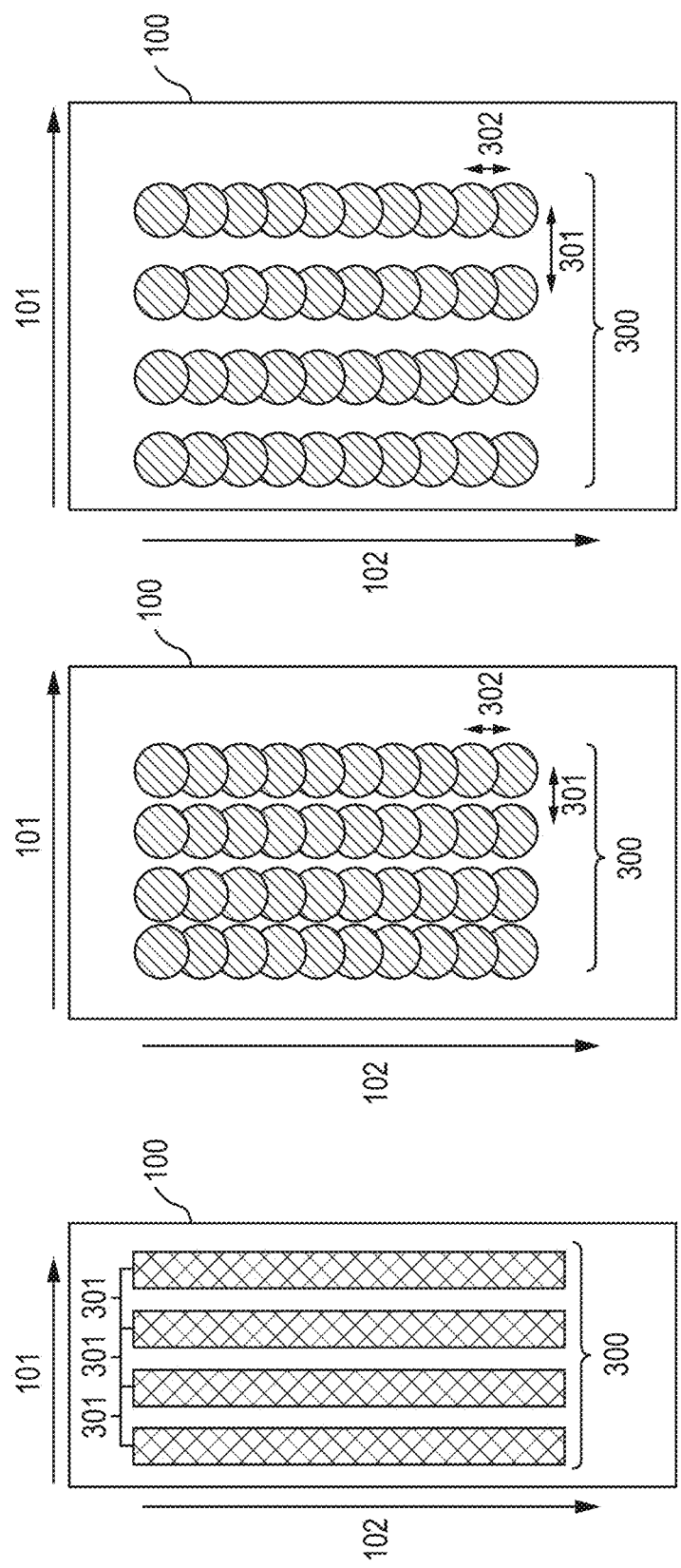
FIG. 9 shows exemplary anisotropically patterned alignment layers with anisotropic patterns formed by laser action according to one embodiment.

The laser pulse and the rate of laser beam and/or alignment layer translational movement, may affect the surface patterns. The laser energy is applied to the first surface in such a manner that the space to space distance between two adjacent pulses (herein called "laser pulse spacing"). Preferred ranges for the laser pulse spacing include 0.1 nm to 500 µm, 0.1 nm to 1 nm, 0.5 nm to 1 nm, 0.5 nm to 500 µm, 50 nm to 500 µm, and more preferably from 5 nm to 500 µm. Thus, the resulting alignment layer has an anisotropic pattern 300 with a first periodicity 301 in a first direction 101 in the plane of the surface. This is shown in FIG. 9.

The laser energy can also be applied in a manner such that the anisotropic pattern 300 has a second periodicity 302 in a second direction 102. Preferred ranges for the second periodicity include 0.1 nm to 500 µm, 0.1 nm to 1 µm, 0.5 nm to 1 nm, 0.5 nm to 500 µm, 50 nm to 500 µm, and more preferably from 5 nm to 500 µm. FIG. 9 is a schematic presentation of different anisotropic pattern 300 formed in first surfaces 100. Some of these patterns have two periodicities 301 and 302 running in two different directions 101 and 102 in the plane of the first surface 100. While they are shown running in the x-y axis of the first surface, they can run in different directions not aligning with the x-y axis of the first surface. Additionally, the directions can be non-perpendicular to each other. These periodicities in conjunction with the first surface's reaction with the laser energy will define the final anisotropic patterns 300 in the first surface. For the purpose of creating the alignment layers disclosed in FIGS. 1-4, the first periodicity 301 is different from the second periodicity 302. In this way, directional channels/grooves are formed in the first surface 100. Embodiments, herein, however, also include alignment layers with an anisotropic pattern 300 with only one periodicity running in one direction of the first surface. FIG. 9 shows both types of anisotropic patterns 300.

Figure 8:
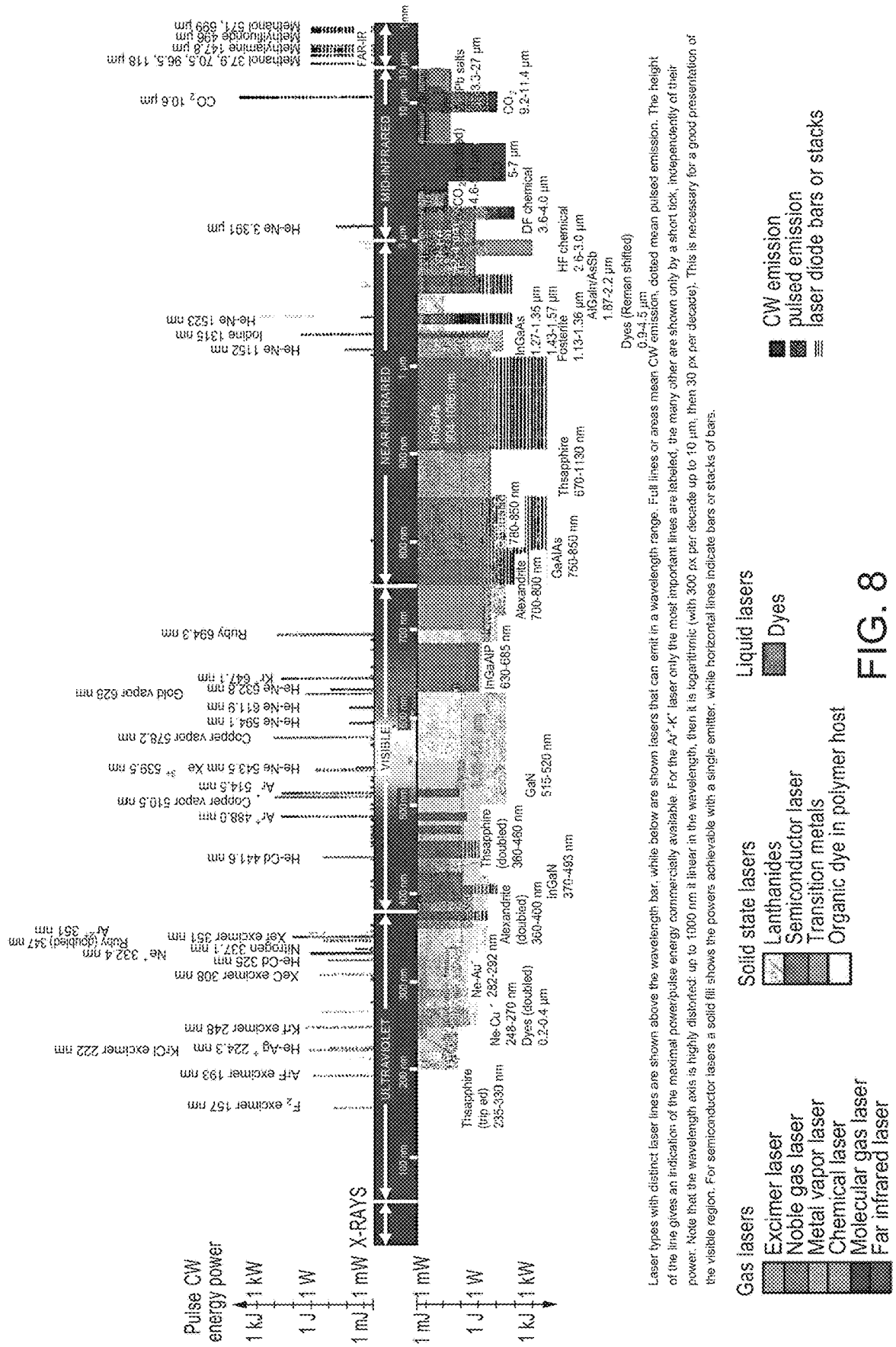
FIG. 8 shows wavelengths of commercially available lasers.

Embodiments disclosed herein may be implemented with any commercially available laser or other suitable Laser, and can be of different nature, gas lasers, liquid lasers, or solid state lasers of different wavelengths, depending on the material of the first surface. These include but are not limited to ND:YAG, Ar-Laser, CO2 laser. The laser action with the first surface material can be of different nature, including but not limited to melting the material, burning/evaporating the material, curing the material, and etching the material. FIG. 8 gives an overview of different commercially-available lasers (including their operational wavelengths) with continuous and pulsed emission. Laser types with distinct laser lines are shown above the wavelength bar, while below are shown lasers that can emit in a wavelength range. The height of the lines and bars gives an indication of the maximal power/pulse energy commercially available, while the color codifies the laser material. Most of the data comes from Weber's book *Handbook of Laser Wavelengths*.

In some embodiments, the anisotropic pattern's chemical nature may greatly affect the orientation of overlaying LC molecules on such patterned surfaces. The pattern's chemical nature is affected by the composition of the first surface. Thus, the first surface 100 on which the laser energy is applied may be comprised of inorganic materials, including but not limited to ITO, $SiO_2$, $ZrO_2$, and $ZnO_2$. For example, the same patterns made in ITO or $SiO_2$ or Teflon material might generate very different LC orientations. In the case of patterns made in a first surface comprising ITO, the LC alignment is most likely to be planar or low-pretilt planar LC alignment, while a homeotropic LC alignment is expected on the same patterns made in a first surface comprising Teflon-like material. For example, in one embodiment, the laser beam with wavelength of 1064 nm is applied over a first surface comprised of ITO or $SiO_2$, generating surface patterns by directional material removal, i.e. material etching.

In some embodiments, the first surface may be comprised of polymers. For example, in one embodiment, the laser beam with wavelength of 365 nm is scanned over a first surface comprised of acrylate prepolymer (exhibiting a significant degree of shrinkage upon cross linking), generating directional surface features by anisotropic cross-linking/shrinkage/wrinkles (i.e. directional curing of the material). Moreover, the laser beam can be linearly-polarized generating a wider spectrum of directional features in the "directionally-reactive" first surface material. In another embodiment yet, a powerful laser can be used to create anisotropic patterns 300 by burning/evaporation of the material of the first surface. Theoretically, the inkjet method can be applied to surface/substrate made of any material. Depending on the interaction of the solution and the substrate material, a variety of surface features are possible. In the laser method, substrate materials have certain types of interaction with the laser beam. For example, a polyacrylate substrate or polycarbonate substrate may not interact significantly with a laser beam of 1064 nm, but these two substrates can be used with the inkjet printing method. There will be materials applicable for both types of methods, inkjet and laser, for example, metallic/conductive surfaces. However, the resulting patterns on the same substrate material made with the two methods can be different, and consequently, can give different LC alignments, i.e. different orientational order parameters.

In some embodiments, the laser can be continuous or pulsed laser. In the case of continuous laser, various scanning speeds of the laser beam over the first surface, or various translational movements of the first surface under the static laser beam, or various mutual translational movements of both, the laser beam and the first surface, are possible. In the case of pulsed laser, the laser intensity (the pulse intensity/power), the pulse frequency and laser scanning speed can be varied in a manner to generate the desirable anisotropic pattern 300. Also, in the case of pulsed laser, translational movement of the laser, first surface, or both are possible.

In some embodiments, the first surface 100 may further comprise nanoparticles of metals or metal oxides, and carbon nanotubes, individually or in any combination. The laser might have different interactions with the nanoparticles/nanotubes than with the surrounding material/matrix. By adjusting the laser processing conditions, a variety of patterns are possible in first surface materials containing nanoparticles/nanotubes as shown in FIGS. 12A-B. Such nanoparticles/nanotubes might further help in the orientation of the overlaying LC molecules, but also might contribute to an additional property of the alignment layer, such as light diffraction properties, light management property (including but not limited to focusing or defocusing light rays) and light scattering effects.

The method may further include steps for incorporating the first surface 100 into an electro-optical device as shown in FIG. 5C. These steps comprise providing a first substrate 400 and providing a first electrode 500 disposed over the first substrate. The method can comprise disposing the first surface 100 over the first electrode 500, providing a liquid crystal layer 700 disposed over the first surface, providing a second surface 1100 disposed over the liquid crystal layer, providing a second electrode 900 disposed over the second surface, and providing a second substrate 1000 disposed over the second electrode 900. As used herein, "disposed over" allows for intervening layers between the first surface and the substrate. The second surface 1100 has a second anisotropic pattern 1300 formed on the second surface. The second anisotropic pattern 1300 is similar to the anisotropic pattern 300 and is formed in the same manner as the first anisotropic pattern 300.

Modeling

By way of non-limiting example, FIG. 10A-C show surface patterns made in ITO layer with 1064 nm laser beam at scanning rate of 400 mm/s and frequency of 20 kHz. As seen in FIGS. 10A-C, there is good pattern reproducibility. Groove depths of about 20 nm were achieved by laser etching action in the ITO layer. The resulting alignment layer has a 70 µm periodicity in the horizontal direction of the first surface. The laser pulses were sufficiently close together that the grooves do not show noticeable periodicity in the scanning direction.

Figure 11:
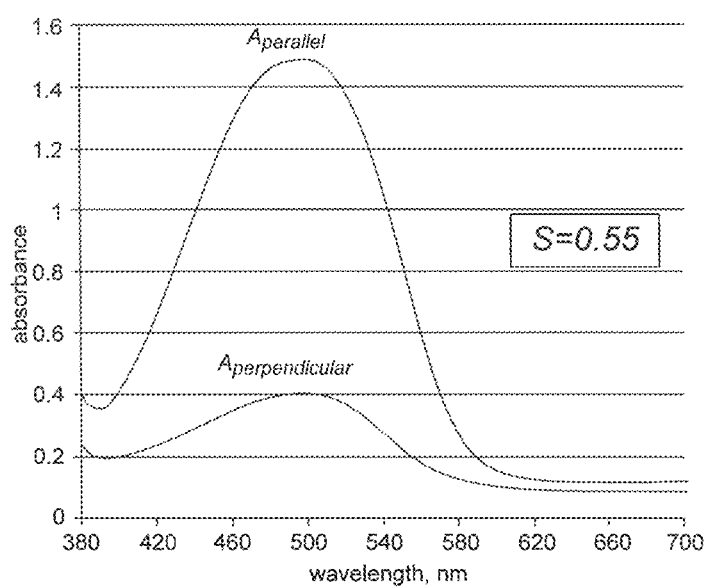
FIG. 11 shows polarized absorption spectra of 7-micron-thick nematic liquid crystal layer used with the alignment layer of FIGS. 10A-10C.

The surface pattern shown in FIGS. 10A-C was further tested for its LC alignment capability. For this purpose, 7-micron-thick nematic LC cell lightly doped with a dichroic dye (Disperse Red 1) was prepared. Commercially-available nematic LC MDA-98-1602 (Merck) was doped with 0.3-0.5 wt % dichroic dye Disperse Red 1 (Sigma Aldrich), and then, injected in an empty LC cell, previously prepared with substrates that have ITO layers with patterns made by laser etching (like those in FIG. 4). The empty LC cell was filled with the dye-doped nematic LC at temperature above the clearing temperature of the LC crystal, and then, it was cooled down slowly to room temperature. To assess the quality of LC alignment, a dye polarized absorbance was recorded for this cell under the assumption that the dichroic dye (Disperse Red 1) is oriented in the same manner as the surrounding rod-like LC molecules. In FIG. 11 below, the polarized absorption spectra of the dye doped in the nematic LC. Due to the orientation of the dye within the nematic host, a difference in the dye polarized spectra $A_{parallel}$ and $A_{perpendicular}$ ($A_{parallel}$=dye absorbance parallel to the alignment direction; $A_{perpendicular}$=dye absorbance perpendicular to the alignment direction) was observed. Furthermore, the orientational order parameter, S, was calculated for this cell according to the following equations:

$$R = \frac{A_{parallel}}{A_{perpendicular}}$$

$$S = \frac{R-1}{R+2}$$

where R is the dichroic ratio, $A_{parallel}$ is the dye absorbance parallel to the alignment direction and $A_{perpendicular}$ is the dye absorbance perpendicular to the alignment direction. The alignment layer achieved very good LC alignment expressed with a high orientational order parameter S of 0.55.

The invention claimed is:

1. A method comprising:
   providing a first surface;
   depositing a solution over the first surface via inkjet printing to form a first anisotropic pattern; and
   solidifying the solution to form a first anisotropically patterned alignment layer having features with a size of 5 nm to 500 µm,
   wherein the first anisotropic pattern formed by the deposition has a first pitch of 5 nm to 500 µm in a first direction in the plane of the first surface.

2. The method of claim 1, wherein the first anisotropic pattern formed by the deposition has a second pitch in a second direction in the plane of the surface, the first direction is different from the second direction, the first pitch is different from the second pitch, and the second pitch is 5 nm to 500 µm.

3. The method of claim 1, wherein depositing the solution includes depositing drops of the solution and solidifying the solution includes partially coalescing the drops while retaining at least some structure of the first pitch.

4. The method of claim 1, wherein the first surface is a first surface of a substrate.

5. The method of claim 1, wherein the first surface is a first surface of an electrode.

6. The method of claim 1, wherein the first surface is a first surface of a separate layer disposed on an electrode or a substrate.

7. The method of claim 1, further comprising:
providing a first substrate;
providing a first electrode disposed over the first substrate;
disposing the first surface over the electrode;
providing a liquid crystal layer disposed over the first surface;
providing a second surface disposed over the liquid crystal layer;
providing a second electrode disposed over the second surface; and
providing a second substrate disposed over the second electrode.

8. The method of claim 7, wherein:
providing the second surface comprises depositing the solution over the second surface via inkjet printing to form a second anisotropic pattern; and
solidifying the solution to form a second anisotropically patterned alignment layer having features with a size of 5 nm to 500 µm and a third pitch of 5 nm to 500 µm in a third direction in the plane of the second surface.

9. The method of claim 8, wherein the second anisotropic pattern has a fourth pitch in a fourth direction in the plane of the second surface, the third direction is different from the fourth direction, the third pitch is different from the fourth pitch, and the fourth pitch is 5 nm to 500 µm.

10. The method of claim 1, wherein the step of solidifying the solution comprises illuminating the solution with ultraviolet radiation.

11. The method of claim 1, wherein the step of solidifying the solution comprises heating the solution with infra-red radiation.

12. The method of claim 1, wherein the solution comprises at least one of a conjugated polymer, an acrylate, a urethane, an organosilane, or an epoxy.

13. The method of claim 1, wherein the solution comprises at least one of a surfactant or a binder.

14. The method of claim 1, wherein the solution comprises at least one of an alcohol, a ketone, an aldehyde, an alkane, an alkene, or a chlorinated solvent.

15. The method of claim 1, wherein the solution comprises nanoparticles of at least one of a metal or a metal oxide.

16. The method of claim 1, wherein the solution comprises carbon nanotubes.

17. The method of claim 1, further comprising:
aligning at least one of a nematic, cholesteric, smectic, discotic, or blue-phase liquid crystal layer with the anisotropically patterned alignment layer.

18. The method of claim 1, further comprising:
aligning, with the anisotropically patterned alignment layer, a nematic liquid crystal layer with an orientational order parameter of at least S=0.50.

19. The method of claim 1, further comprising:
at least one of managing, scattering, or diffracting light with the anisotropically patterned alignment layer.

* * * * *